United States Patent [19]
Schweitzer, III et al.

[11] Patent Number: 6,011,480
[45] Date of Patent: Jan. 4, 2000

[54] PROTECTION QUALITY CAPABILITY FOR PROTECTIVE RELAYS USED IN AN ELECTRIC POWER SYSTEM

[75] Inventors: Edmund O. Schweitzer, III; Jeffrey B. Roberts, both of Pullman, Wash.

[73] Assignee: Schweitzer Engineering Laboratories, Inc., Pullman, Wash.

[21] Appl. No.: 08/898,793

[22] Filed: Jul. 23, 1997

[51] Int. Cl.[7] .................................................. G08B 21/00
[52] U.S. Cl. .......................... 340/644; 340/636; 340/638; 340/657; 361/35; 361/78
[58] Field of Search ..................................... 340/635, 636, 340/638, 644, 657, 661; 361/1, 35, 78

[56] References Cited

U.S. PATENT DOCUMENTS

| | | | |
|---|---|---|---|
| 4,591,940 | 5/1986 | Sun et al. | 361/68 |
| 5,243,291 | 9/1993 | Umemura | 340/644 |
| 5,751,532 | 5/1998 | Kanuchok et al. | 361/94 |
| 5,763,961 | 6/1998 | Dreyer et al. | 340/644 |

*Primary Examiner*—Daniel J. Wu
*Attorney, Agent, or Firm*—Jensen & Puntigam, P.S.

[57] ABSTRACT

The system for determining protection quality of a protective relay and related functions of the protection system include obtaining information concerning the output status of the various protective elements in the relay. The status of various operations in the protective element are also evaluated against specific standards. The operation of supervisory and control elements affecting the action protective elements are also evaluated. Other aspects of the relay, including the availability of the relay and the operation of the voltage and current transformers are also evaluated. In addition, associated aspects such as the status of the communication channels, the station voltage availability and the condition of the trip and close circuits are monitored. All of the above is analyzed in a summary report to provide an indication of protection quality for the relay and associated protection system functions.

17 Claims, 4 Drawing Sheets

PROTECTION QUALITY CAPABILITY FOR PROTECTIVE RELAYS USED IN AN ELECTRIC POWER SYSTEM

TECHNICAL FIELD

This invention relates generally to protection systems, including protective relays, used in electric power systems, and more particularly concerns the evaluation of the operation of selected functions of the protective relays and the operation of related functions of the protection system against pre-established standards to provide an indication of protection quality.

BACKGROUND OF THE INVENTION

Historically, power system protective relays, in particular electromechanical relays, only provided an indication of whether or not they had operated to produce a trip (opening) of an associated circuit breaker. Usually this information was provided via a light or a colored "drop panel", on the front of the relay, known as a target. These targets were usually reset manually. Sometimes, on very important power lines, utilities installed sequence-of-event reporting (SER) equipment and/or oscillographs. This was done to determine whether a particular relay's trip operation (when it occurred) was in fact correct. However, such equipment, which is independent of the individual relays, typically produced a substantial amount of data, which required well-trained personnel substantial time to analyze and to reach a conclusion concerning proper operation of the device. Delays in evaluating the data and the experience of the analysts, however, made sequence-of-event reporting analysis somewhat problematic. Additionally, the analog data measured and reported by an oscillograph might not be the same data measured and utilized by the protective relay in reaching its trip decision.

Without such additional equipment, however, proper operation of the relays was difficult, if not impossible, to determine. With simple "target" indications, for instance, it was not even possible for the operator to be sure that a lit target was from the most recent trip of the relay. The SER/oscillograph equipment itself, however, had inherent disadvantages of high cost of purchase, installation and maintenance. Additionally, wiring to an SER from several independent relays could result in a failure of a portion or all of the protection system in the event of a failure of an input to the SER.

With the development of digital (microprocessor based) relays, however, information could be readily produced from the relay apparatus itself concerning the status of various aspects of the relay at selected times, notably at the time of generating a trip signal for an associated breaker. This has become known as "event reporting". Event reports typically set forth with significant particularity the input voltages and currents to the relay, go/no-go status of the various relay elements, the various element settings and the contact I/O status during the times of disturbances within the power system, all as a function of time. Thus, detailed information on the operation of the relay was and is now available to the user without the installation of special additional equipment, such as the SERs and oscillographs described above.

The information provided by an event report will typically span in time the pre-fault, fault and post-fault conditions of the power system, so that the performance of the relay elements, as well as the value/condition of the voltages and currents on the power line and the relay input and output contacts, can be seen throughout the event. The information which is available from the event report is quite significant. At least some of the information available from event reports would not be obtainable even from known separate equipment. Examples of such information include fault location, relay target status, fault duration (as measured by the relay) and the actual analog input quantities available to the relay. The status of many internal elements of the relay, relative to the analog inputs, with respect to time, are also reported. Such information is not available through external separate equipment such as SERs. The status of certain internal elements of the relay can in some cases be ascertained with output contacts and programming the relay elements to the output contacts. However, this approach is expensive and requires knowledge of any regular delay in the operation of the output contacts.

SER devices are still used, however, on some power lines, in addition to protective relays which produce the above-described event reports. Such an arrangement, of course, results in a large amount of data. The more data, however, the more difficult and the longer it takes to thoroughly and correctly analyze it. A current trend is to store more and more information, with higher and higher resolution. This trend, fueled in part by lower processing and memory costs, creates more data than can be practically examined by an analyst and thus actually hinders performance analysis, even though it is believed that the additional information will assist the analyst in evaluating proper protection system operation.

Some relays store many seconds worth of 64 samples per cycle data around each event. This data must be downloaded from the relay to a computer and interpreted by an experienced analyst to evaluate a particular relay operation relative to the event. All of this analysis, of course, takes a considerable amount of time, even for trained analysts, to perform. The likelihood of obtaining fast conclusions from such large amounts of data is relatively unlikely and only will worsen with more data.

In addition, it is often the case that several relays in a protection system will produce event reports for the same event. For instance, it is easily possible that a single fault will have an effect on as many as twelve or even more line terminals. If each line terminal has at least one protective relay with data storage and event reporting capability, it can be readily seen that the analytic requirements quickly become very high. With this large amount of data available to be analyzed, it is common for analysts to evaluate only the most likely relays for possible misoperation. This leads to missed opportunities for correction of unknown system shortcomings, which if corrected in time would avoid future misoperations.

Even with the additional data being collected, there are some relay operations which require such a long time to complete, that the data showing the entire operation of the relay simply cannot be reasonably collected and analyzed. For instance, 15 seconds of recorded data for an event is an exceedingly long time. This could be as much as 57,600 rows of data for just one relay. With multiple relays responding to a fault, the data becomes overwhelming. The large amount of data may ironically result in a delay or even a complete miss of particular problems in the system.

Yet, some elements have an operating time substantially in excess of 15 seconds. Some time overcurrent elements, for instance, have an operating time of over 100 seconds. Hence, even a relatively long 15-second data collection period would still not be adequate to evaluate the performance of such relay elements.

Another difficulty with large amounts of data collected is the storage capacity which must be available in the relay. This adds significant cost to the apparatus, which is eventually passed on to the ultimate purchaser thereof.

Hence, even though protective relays now have the capability of accumulating a large amount of potentially important data relative to a system event, information concerning the actual performance of the relay requires a detailed analysis of all that data, which still may be incomplete relative to a true picture of relay operation. Further, promptness of the data analysis frequently becomes an issue, due to lack of experienced personnel, the increasing volume of the data collected and/or adequate time of the personnel. Thus, data may be available (even though incomplete), but nothing really useful results. Important information about the overall quality of the protection system in effect remains hidden in the large volume of data which is collected but not effectively analyzed.

A system is needed to provide accurate information on protection quality/performance rather than just raw data. Further, such a system should be able to communicate the conclusions to those who have the operational responsibility for the system.

DISCLOSURE OF THE INVENTION

Accordingly, the present invention is a system for determining protection quality of a protective relay, having one or more protective elements therein, comprising: means for obtaining information concerning the output status of protective elements in the relay which have a significant effect on the operation of the relay and the status of at least one operational function for each of said protective elements which affects the output status of that protective element; means for obtaining information concerning the operational availability of the relay; means for comparing said output status information and said availability information against preestablished standards; and means for providing output information relative to the results of said comparison.

BEST MODE FOR CARRYING OUT THE INVENTION

The present invention is a system for automatically evaluating and reporting the actual or "true" protection quality of a digital protective relay and related portions of the protection system for a power line. Typically, but not necessarily, the relay will have the capability of providing event information. By collecting and automatically evaluating conventional event data, along with certain additional information concerning particular aspects of the relay and certain other protection system functions, as discussed below in detail, an evaluation of the "protection quality" of the relay and related portions of the protection system, relative to actual performance, can be obtained. In essence the protection quality of the protection system which encompasses the relay and associated portions of the power system can be defined.

In a digital protective relay, as indicated above, the voltages and/or currents on the power lines are continually obtained and then reduced to an appropriate level, usually by means of input transformers (CTs for current transformers and VTs for voltage transformers). In addition, the status of contact inputs on the relays, which provide certain input information, as well as contact outputs, which provide output control commands, is also determined. These voltages, currents and the status of the contact inputs and outputs are then processed digitally, in a software-controlled microprocessor, in accordance with selected algorithms and logic to implement particular relay functions, i.e. time overcurrent, impedance, fault direction functions, etc. These implementations, of different conventional relay functions, are still referred to as relay "elements" (using electromechanical relay terminology), even though carried out in software. A single digital relay will typically include a plurality of relay functions or elements.

In operation, such a relay determines corresponding quantities from the voltages and/or currents obtained from the power lines and then compares those quantities against preselected threshold values in accordance with desired relay functions. The relay then produces control output signals, such as trip signals, communication channel keying signals, etc. During such operations, the relay makes a record of the actual data including specifically the inputs and outputs. The data is saved for successive time intervals, typically covering ten or more cycles of line power. The time intervals are typically ¼ to ¹⁄₆₄ of one power system cycle. When an "event" occurs, this data is then provided in the form of an event report. An eleven cycle long event, for instance, with data obtained every ¹⁄₁₆ cycle, is 176 rows long.

In the present invention, additional data is obtained concerning the operation of the relay and the various functions thereof as well as related protection system data. For instance, for a particular system disturbance, actual signal levels present at various portions of the relay elements are saved, as well as the final output status of those elements. Time information is also saved; for instance in a time-coordinated system, the present invention determines how close a particular coordinating time interval was approached by a particular element of the relay and other devices for a particular event, even though the relay may not have produced a trip signal. The closeness of the fault current to the relay element pickup threshold may also be determined. These are just a few examples; additional examples, with more complete explanations, are provided below. Thus, not only are the actual numerical inputs of currents and/or voltages obtained and the binary control outputs (go no/go) of the various relay elements, but also various signal levels within the relay elements and the actual signal levels used to determine the outputs.

It should be understood that much of this information is typically not available from present relays, or if available, is not used as discussed herein to provide an evaluation of system performance or quality. The specific data discussed below is not intended to be exhaustive or to completely define the "protection quality" evaluation possibilities of the present invention. Rather, it should be understood that the present invention is directed toward obtaining a certain amount of selected data concerning operation of the relay which provides performance information and then evaluating that data to determine protection quality of the relay and related portions of the protection system.

In making a determination of protection quality for a relay and associated portions of the power system, a number of specific aspects of relay performance are evaluated. An event report summary is provided, which gives an overview of but not detailed data concerning the last event. This summary information can be quickly reviewed by a power engineer or other analyst, who then can make an easy, rapid decision as to whether or not to download additional event information for further review. This is an aspect of protection quality. The summary report will include the number of performance exceptions of the relay and associated protection system functions, i.e. the number of specific areas where a relay's performance and the performance of associated protection system elements do not reach acceptable standards.

The protection quality system will maintain a log which specifies the "availability" of every critical component or element (function) in the relay and other critical associated elements in the protection system, including for example the CTs and/or VTs and the battery and control circuits. The availability "score" is the reverse of "down" time, i.e. total time minus down time, divided by the total time. For example, over a certain time period, say one year, the protection quality system will determine the percentage of time the relay was energized and available for its protection function. Availability of the relay within the overall protection system is an important aspect of protection quality. Also, the precise value or score of availability for a particular relay, and related protection system functions/inputs, can be compared with other relays, either at the same substation or different substations, to determine how and if particular power system operating practices affect availability.

Another protection quality standard is the VT (voltage transformer) and CT (current transformer) analog inputs. In this regard, the percentage of time that the input voltages and/or currents were actually available to the relay during the time that the line breaker is closed is determined. Certain logic functions, which supervise and/or control the operation of other relay functions, such as loss of potential and open phase logic, to detect defective VTs and CTs, respectively, are also monitored. Monitoring the availability of the VT and CT analog inputs provides an indication of the reliability of those inputs as well as information concerning the length of time necessary to correct problems with the operation of those devices. It should be recognized that alternatives exist to traditional transformer analog input devices. Transducers or optical inputs, as examples, could be used. The present invention would monitor the availability of such alternative input devices.

The initiating conditions of a breaker trip event are also tracked. Unconditional trip, communication scheme assisted trip and switch-onto-fault trip signals are all examples of trip variables which assert when the relay determines a particular fault condition. Event report triggering is a variable which also must assert for the relay to generate an event report. If a particular relay does not trip for a fault, none of the tripping variables will assert. Many things can trigger a relay to store an event report. As the list of possible trigger conditions is quite long, most relays will permit the user to select the conditions for which an event report is generated by a programmable variable. In the present invention, the programmable variable is labeled ER. Users program ER with protective element pickup status, input and output status, etc. to generate an event report when the relay detects a protection quality alarm condition, the user need only program the protection quality bit, labeled PA, into the ER variable. If the protection quality alarm condition is detected via external inputs, an external triggered performance alarm (ETPA) bit asserts. To trigger an event report for this condition, the user need only program the ETPA bit into the ER variable.

An important aspect of protection quality involves an analysis of the complete operation of each of the elements in the relay. The operation issues include how close to the pickup threshold each element was in response to the event and for time-delayed elements, for instance, what was the percentage of time-out and/or did the percentage of time-out of the element exceed any system coordinating margin. When any element is outside the expected norm, the protection quality operation in the relay will issue a performance alarm or exception. This alarm can then be used to trigger an event report. It is thus easy to determine which element in the relay has in fact exhibited an actual performance problem or a potential problem, without the necessity of expert analysis of raw data.

For instance for a directional element, information is provided as to what direction the directional element declared, which directional element declared which direction, whether or not the directional element was almost blocked by a supervising condition, and whether the fault was close to a directional element boundary. As another example, for timing elements, it is determined how close the element was to timing out, even if in fact it did not.

Thus, the entire performance of each element in a relay is evaluated, as opposed to only one aspect of the element's performance, i.e. the go/no-go binary control output. For instance, specifically for a definite time-delayed overcurrent element, instead of just evaluating the output go/no-go, the present invention will also look at the percentage of pickup of the overcurrent element threshold and the percentage of time out for the definite delay timer.

Another aspect of relay-related system performance includes the operation of the trip and close circuitry for the circuit breaker. The protection quality relay will include trip and close circuit monitoring logic. If the percentage of pickup is marginal and the relay trips, or if the timer nearly expires and the relay does not trip, then a performance (protection quality) exception is noted and the PA (protection quality alarm) bit asserts. The exception generates a log item and then an alarm. With current relays, marginal operation cannot be determined and such relays continue until a significant misoperation occurs. The numerical availability of the trip and close circuits can then be compared against performance thresholds or against similar information from other installations.

In the digital relay with protection quality, another significant performance aspect is the particular amount of time the relay uses each of the operational setting groups, selected by an operator. It is possible with the present system to determine what percentage of time the relay operates in particular setting groups. This can help determine for instance, how many setting groups are really necessary for a particular installation. This can be another aspect of protection quality. A number of logs are also maintained relative to relay performance. First, a log of the status of the input and output contacts during an event is maintained. An analyst can quickly determine which input and output contacts change state during an event, how many changes of state occurred, and the final state of the input-output contacts, without having an analyst review raw data. Further, pre-fault, fault and post-fault magnitude and angle values for the input voltages and/or currents are logged so that the analyst can understand how much a particular fault or other system disturbance actually disrupted the power system voltages and/or currents.

In addition, for a particular event, a pilot channel-assisted tripping scheme performance log can be maintained. For such a log, information is obtained concerning whether a current reversal occurred during the fault, as well as an evaluation of the coordination of the timing margins, arrival of a permissive signal and arrival of a permissive signal relative to the pickup/dropout of the protective elements at the relay location. Information is also determined as to whether a current reversal was out-to-in section or in-to-out section.

The above information provides a generally complete overview of relay performance, i.e. protection quality. Additional data concerning various other aspects of relay performance may also be obtained and evaluated in certain situations. Different relays will require different data evaluations, depending on the particular functions of the relay. The important issue is that for protection quality, the significant functions of the relay must be thoroughly evaluated. Further, there are other associated/related protection system performance quality characteristics which can be evaluated relative to a particular protective relay, but which are not directly related to the internal operation of the relay.

Load encroachment (such as disclosed in U.S. Pat. No. 5,367,426, owned by the assignee of the present invention) in the relay is also reviewed. Heavily loaded circuits use load encroachment logic in the relay to restrain overcurrent or distance elements from picking up for what are actually normal load conditions. If the load encroaches on any boundary of either of the load encroachment elements, the relay will issue a performance alarm, indicating that the load encroachment function is not set properly.

Protection quality for a particular relay could also include the operation of the communication channels. For instance, it is helpful to know what percentage of time a traditional communications channel was available, as such channels are often depended upon for a rapid trip of the line to internal faults. With devices using traditional communications channel, information exchange between the communications equipment and the protective relay is accomplished by contact input/output connections.

Protection quality analysis for a particular communication channel will provide information relative to that particular channel concerning future installations for the overall system. In addition, if other types of communications channels are used, the availability of such communication channels will be considered.

As an example, in a conventional permissive overreaching transfer trip scheme, either guard or permissive trip signals are provided to the relay via contacts. If either of the contacts are closed, the communications channel is available. If neither contact is closed the channel is not available. If the contacts are energized by a communication voltage source, such as a battery, which is different than that which energizes the relay, the relay can also measure the communications voltage battery for availability by means of circuits connected to the relay contact inputs.

Where digital communications via serial ports are used, the relay monitors a variety of indications to determine if a channel is available and the message valid. Examples of such indications include 1) byte flag check, 2) byte flag order received check, 3) cyclic redundancy check, 4) parity check and 5) framing error check, among others.

Another protection quality issue involves the availability of DC voltage from the substation battery for the relay and other equipment in the protection system. The VDCPS (voltage DC power supply) measures the station DC voltage presented to the power supply for the relay. If the availability of DC voltage is greater than the overall "availability" of the relay (discussed above), then it is known that the relay was unavailable during some period of time for reasons other than lack of power to the relay.

Generally, for the overall protection system to work, many devices, including CTs, VTs, the particular relay itself, the station battery, the circuit breaker and the control circuits, must all be "available". The present protection quality system, by monitoring the availability of the above elements, thus monitors in effect the availability of the entire protection system. Failure of any of the individual elements to be available results in the protection system being unavailable.

A log is also kept of the station DC battery voltage level. Typically, electrical substations use multicell lead acid batteries. If the batteries are properly sized and charged, if the battery charger is functioning correctly and the load wiring is sized correctly, then operating the circuit breaker will not adversely affect the DC voltage level to the relay. The protection quality system could also evaluate the performance of the DC voltage levels against expected maximum/ minimum levels, during tripping, closing and other operations.

A reclosing history log may also be maintained. The number of reclosing attempts and reclosing times and the particular fault types that reclosing attempts were allowed are reviewed. This aspect of protection quality monitors the overall reclosing success rate and the success rate by fault type. This information allows a quick and easy evaluation of the history of reclosing performance. The history information, for a sufficient time and area, is useful in optimizing reclosing practice.

Another system aspect of protection quality could be operation of the circuit breaker itself, which has a combination of mechanical and electrical features. A breaker performance log will provide important information to determine whether or not the breaker is operating properly or needs maintenance. In this regard, the breaker contacts, trip coil and close coils are evaluated against expected operating standards. Further, system protection quality could involve the listing of the number and type of faults which occur as a function of distance to fault. The concentration of particular faults in certain areas of the transmission line, further classified by fault type, will provide a focus for inspection of the line and/or taking special measures to ensure adequate protection or changing the power line configuration for vulnerable areas. The fault type, for instance, indicates one phase or combination of phases involved in the fault.

The above information represents significant aspects of what represents protection quality of protective relays and directly related aspects of the power system and its overall protection and susceptibility to faults. Basically, the system involves monitoring the performance of various elements in the relay and related aspects of the protection system, to arrive at a simplified evaluation of performance quality. The event report summary provides a listing of all the performance exceptions as well as an overall grade of protection quality, if desired. Additional alarms related to protection quality can alert personnel to performance exceptions for prompt investigation thereof.

Figure 1:
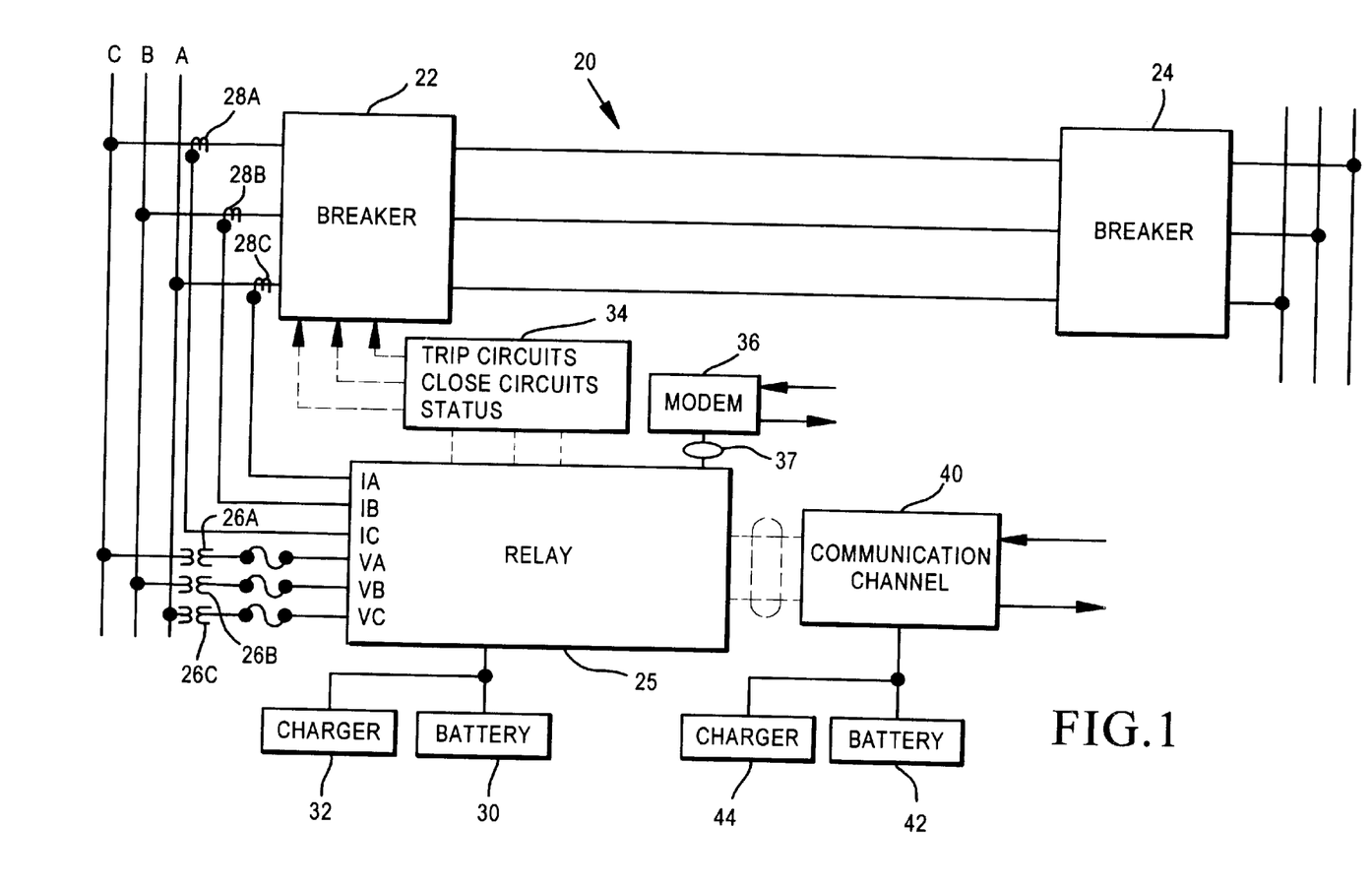
FIG. 1 is a block diagram showing a protective relay and various aspects of a protective quality system.

FIG. 1 shows a protective relay with a protection quality system which evaluates not only the internal operations of the protective elements in the relay as described above, but also, a number of specific associated or related protection system functions. The present invention thus in a real sense is capable of monitoring the protection system for the power line.

A section of a three-phase protected line is shown generally at 20, with two circuit breakers 22 and 24 at opposing ends of the section of the line, protected by a relay 25. The reduced voltages and currents from the VTs 26A through 26C and CTs 28A through 28C are provided as inputs to relay 25. Power is provided to relay 25 by a battery 30, which has a charging circuit 32 associated therewith. The relay 25, with the protection quality circuitry, as explained above, is capable of monitoring the CTs and VTs, the station battery and the charging circuit. Additional inputs to relay 25 include trip circuits, closing circuits and breaker auxiliary switches for indicating breaker position and status, shown as a group at 34. The status and the condition of these circuits and coils can be monitored, as well as contact wear on the breaker.

The input contacts for the communication link with other devices through modem 36 and serial port 37 can also be evaluated as an input to the relay. The status of the relay contacts for the communication channel equipment 40, as well as the communication channel battery 42 and the charging circuit 44 for that battery are also monitored by the protection quality apparatus in the relay.

FIG. 1 is a straightforward structural layout showing several associated protection system function monitoring characteristics of the present invention. Data logs of the above functions are maintained within relay 25, and the data is evaluated against pre-established standards. Exceptions are noted and an alarm provided, if desired. Additional associated protection system functions can be included where appropriate for a particular application. FIG. 1 is not intended to be an exhaustive or exclusive listing of associated protection system functions for protection quality.

Figure 2:
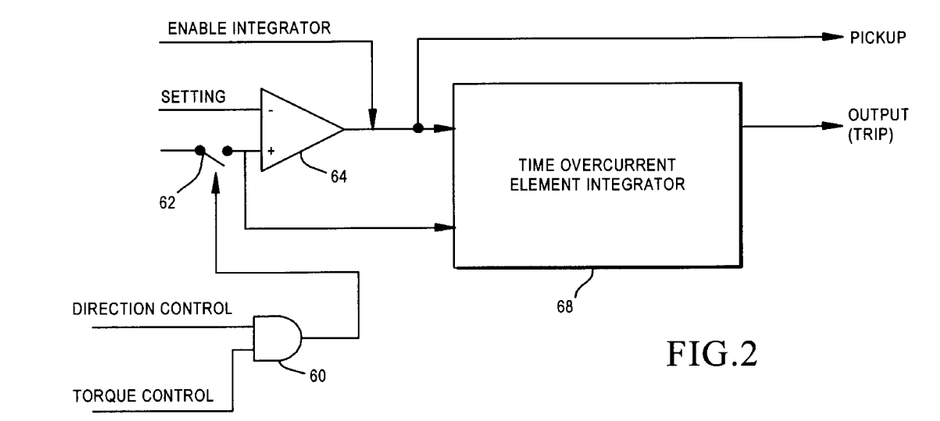
FIG. 2 is a diagram providing an evaluation of the performance of a particular element in a relay, for illustration of some of the principles of the present invention.
Figure 3:
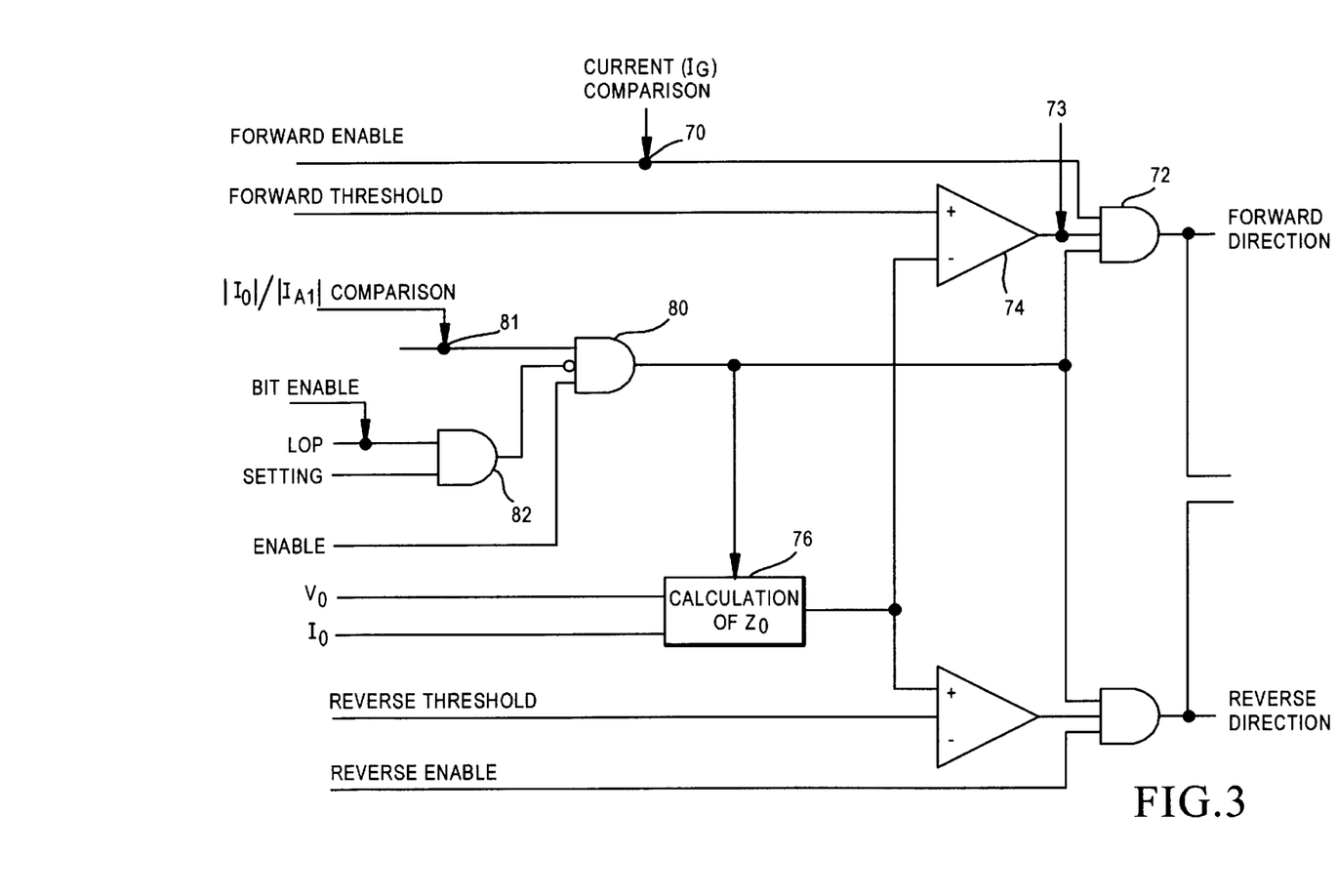
FIG. 3 is a diagram showing the evaluation of the performance of another element of a relay.
Figure 4:
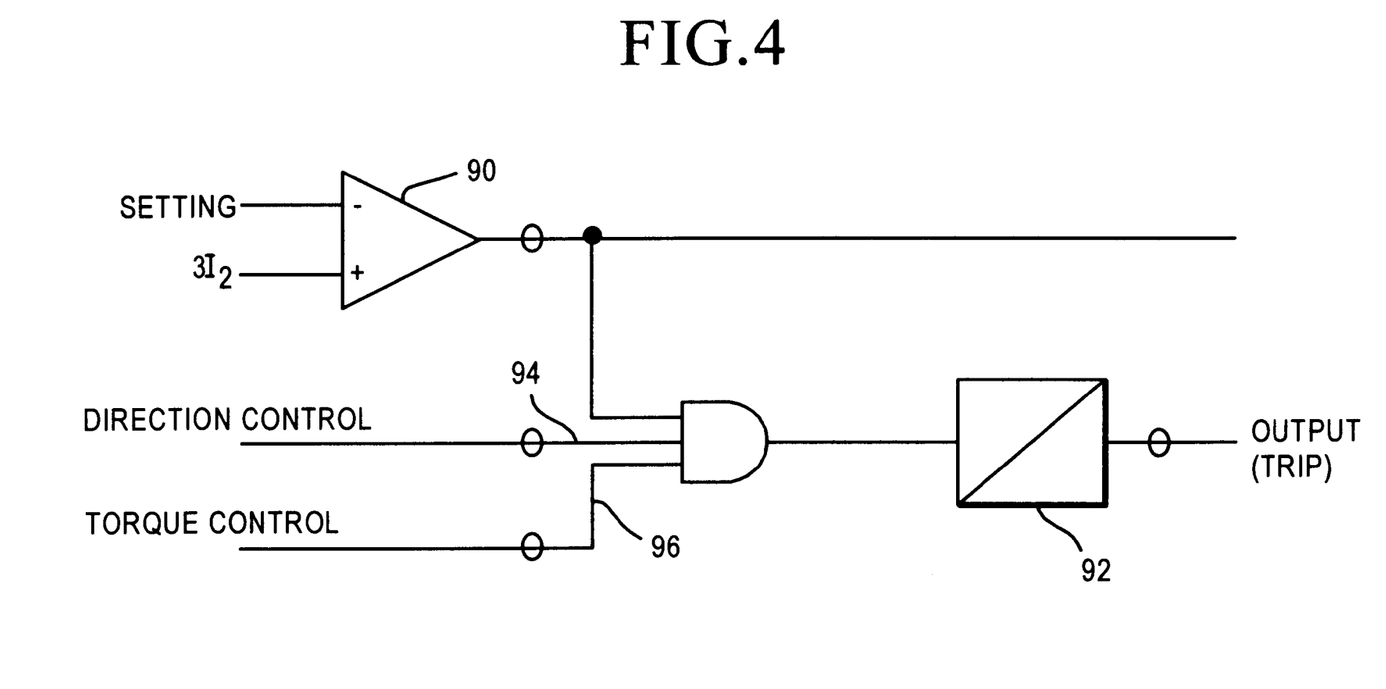
FIG. 4 is a diagram showing the evaluation of the performance of still another element which may be used in a protective relay.

FIGS. 2–4 show illustrative examples of "protection quality" evaluation for internal operations of particular relay elements. The element in FIG. 2 is a phase time-overcurrent element. In this circuit, directional control and torque control enable inputs are provided to an AND gate 60. The output of AND gate 60 is used to control torque control switch 62, which in turn controls one input to a comparator 64. The other input to comparator 64 is a user-established setting. The time-overcurrent integration function performed by the microprocessor is shown at 68. This circuit 68 is a conventional logic circuit implemented as a time-overcurrent element function and is well known.

The protection quality evaluation of the circuit, however, involves more than just the output of element 68. The output of the comparator, which is the input to element 68, is evaluated to see whether or not there is in fact a high (assert) signal at that point. Lack of an input assert signal means that there is no control input and the integrator will hence not integrate toward a trip command for that reason.

Integrator 68 performs the actual timing evaluation. The percentage of time-out will be reported. Lastly, the torque control inputs to AND gate 60 are evaluated. Failure of these inputs to assert will have the same effect as a failure of the control input from comparator 64. Analyzing the above aspects of the operation of the overcurrent element provides an accurate indication as to the actual performance of every aspect of that element.

Another example is shown in FIG. 3, which is a zero-sequence, voltage-polarized directional element. Again with this circuit, not only the final decision of the element is monitored, but also the signal condition of the circuit at several significant points. The overall functional operation of the circuit will not be explained in detail because it is a well-known logic circuit for accomplishing a directional decision. In the present invention, several key signal points are compared with standard values at the time of an event. The description below is for a "forward" direction decision. The same is true for the "reverse" direction. Circuit point 70 is one input to AND gate 72.

The value of ground current ($I_G$) as this point is evaluated with respect to how much above a minimum threshold is the $I_G$ current. The failure of $I_G$ to exceed the minimum threshold (determined by a comparator, not shown) prevents an enabling signal from reaching AND gate 72, an output of which indicates a forward direction fault. The output of comparator 74, which is applied as an input to AND gate 70, is also evaluated. This output of comparator 74 is either high or low. The performance quality aspect of the present invention determines how much the $Z_0$ (zero sequence impedance) value from calculation block 76 is either below (forward direction) or above (reverse direction) the threshold values.

A third input to AND gate 72 is from AND gate 80. The input from AND gate 80 involves a comparison of $|I_0|/|I_{a1}|$ at circuit point 81, where $I_0$ is zero sequence current and $I_{a1}$ is positive sequence current. If this ratio does not meet the minimum threshold, the $Z_0$ calculation is blocked and there is no fault directional determination. In the performance quality evaluation, it is helpful to know whether or not the lack of directional information is due to circuit 76 not producing an output.

Another input to AND gate 80 is a NOT output from AND gate 82. One of the inputs to AND gate 82 is a loss of potential (LOP) signal. A blown VT fuse, for instance, will result in a loss of potential signal and eventually a blockage of the directional indications.

Any one of the above conditions can result in a block of the directional element decision (both forward and reverse). The present invention reports the output decision as well as the status of key circuit points.

FIG. 4 shows another example of the analysis of the complete operation of a protective element for the purpose of evaluating the performance quality of the device. This is for a definite-time delayed, negative-sequence overcurrent element. The output of comparator 70 is either true (high) or not true (low). This signal must be high for the output from timer 92 to be high. The protection quality feature of the present invention determines how much the negative sequence current is above or below the established setting. The status of the direction control line 94 is also quite important, because even though the output of comparator 90 might be high because of a substantial amount of negative sequence current, yet if the control signal on line 94 is low, the output from the timer 92 will still be zero. The torque control input on line 96 is also reviewed, if present.

The output of timer 92 is evaluated both from its actual output condition, i.e. go/no-go, but also the percentage of time out. The combination of the status of various signal points in the circuit as well as the output status of the timer provides the analyst an accurate indication of the overall performance of the circuit. In a conventional evaluation of the performance of the circuit of FIG. 4, the output of timer 92 is evaluated or the output of comparator 90. However, in the present invention, several circuit signal points are evaluated in addition to the output. Overall performance is thus accurately determined.

FIGS. 2, 3 and 4 thus provide three illustrations evaluating the complete performance of several individual relay elements for a given relay. Each important element in a relay will have its performance evaluated in detail. The above examples are for illustration of a system involving detailed performance evaluations, as opposed to evaluating just output information. It is this type of information, along with other key aspects of relay performance, which establishes a meaningful indication of protection quality. Again, the event report summary will provide an overall summary of all of the above evaluations, and perhaps other indications in certain situation, noting all performance exceptions.

The present invention is thus distinguished from a centralized monitoring system, wherein the large amounts of data in the various event reports from a large number of relays are directed to one central location. This requires an expensive, high-speed network and communication channels. Such a centralized system would be less reliable than the above-described invention, especially given the large amount of territory such a centralized system must cover. A centralized system furthermore still requires an experienced analyst or an elaborate analytic system.

Further, immediate notification of protection quality problems is typically not possible with a centralized system. Delay in the communication of data within the network, due to the large amounts of data and the particular protocol arrangements to accommodate such transfer of data results in delays in the overall processing of the information and recognition of particular problems in the system. The present invention is a logical, inexpensive and effective alternative to proposals for a centralized monitoring and evaluation system.

Accordingly, a preferred embodiment of the invention has been disclosed herein for illustration, it should be understood that various changes, modifications and substitutions may be accorded in such embodiment without departing from the spirit of the invention, which is defined by the claims which follow.

What is claimed is:

1. A system for determining protection quality of a protective relay, having one or more protective elements therein, comprising:

means for obtaining information concerning the output status of protective elements in the relay which have a significant effect on the operation of the relay and the status of at least one internal operational function of each of said protective elements which affects the output status of that protective element;

means for obtaining information concerning the operational availability of the relay;

means for comparing said output status information and said availability information against preestablished standards; and means for providing output information relative to the results of said comparison.

2. A system of claim 1, including means for providing an alarm when said comparisons indicate unsatisfactory results.

3. A system of claim 1, wherein the protective elements include elements which provide an output action indication, elements which supervise operation of the output action elements and elements which control operation of the output action elements.

4. A system of claim 1, including means for monitoring the status of input contacts of the relay and providing an indication when said input contact status does not meet preestablished standards.

5. A system of claim 1, including means for determining and reporting the time which the relay operates in each available operational setting group.

6. A system of claim 1, wherein the output information includes a report indicating the number of performance exceptions determined by said comparing means.

7. A system of claim 1, including means for obtaining information concerning the status of sufficient internal operational functions for said elements to evaluate substantially the complete performance of said elements.

8. A system of claim 1, including means for monitoring analog and digital input signals to the relay and providing an indication when said input signals do not meet preestablished standards.

9. A system of claim 1, including means for obtaining information concerning associated protection system functions, comparing said associated protection system function information against preestablished standards and providing output information relative to results of said comparison.

10. A system of claim 9, wherein said associated protection system functions include operation of a circuit breaker controlled by the relay.

11. A system of claim 9, wherein said associated system functions includes the operation of a station DC battery for the relay.

12. A system of claim 9, wherein said associated system functions include the operation of at least one of the current transformers and voltage transformers for the relay.

13. A system of claim 9, wherein said associated system functions include the operation of the communication channels for the relay.

14. A system of claim 9, wherein the information concerning the associated protection system functions includes availability of elements performing said functions, and wherein the system includes means for determining availability of the combination of the relay and the associated system functions.

15. A system of claim 9, wherein said associated system functions include control elements for the relay.

16. A system of claim 1, wherein the relay element is a time-overcurrent element and wherein the output status of the relay concerns time out for the relay and said one internal function is the percentage of time out of the relay element.

17. A system of claim 1, including means for obtaining substantially all of the obtained information for an operator.

* * * * *